UNITED STATES PATENT OFFICE.

JAMES J. ROBINSON, OF BELLEFONTAINE, OHIO.

WOOD-FILLER.

SPECIFICATION forming part of Letters Patent No. 532,011, dated January 1, 1895.

Application filed June 9, 1894. Serial No. 514,106. (No specimens.)

*To all whom it may concern:*

Be it known that I, JAMES J. ROBINSON, a citizen of the United States, residing at Bellefontaine, in the county of Logan and State of Ohio, have invented certain new and useful Improvements in Wood-Fillers, of which the following is a specification.

The object of my invention is to provide a wood-filler of such character that by its use the pores and interstices of wood and other substances may be quickly filled at a minimum of expense and labor.

In compounding my filler I make use of the following ingredients combined in about the proportions hereinafter specified.

It may be remarked that I do not limit myself to the exact proportions of each ingredient recited below for the amount of the same may be varied, as the circumstances of the case require, without departing from the spirit of my invention. In practice, however, I have found that the following proportions give the best results, to wit:

One pound of white glue, one ounce of gum tragacanth, two ounces of silicate of soda, two ounces prepared shellac, eight ounces of corn starch, one gallon of pure water.

In preparing the filler, the glue and gum tragacanth should be dissolved in separate portions of the water which should be heated to a suitable temperature and when the two solutions are complete they should be stirred well together until thoroughly combined. The shellac and silicate of soda should then be added and to the solution while yet warm should be joined the starch which should be intimately mixed therein.

The filler if compounded as above indicated is then ready for use and if used while warm may be applied with a brush, whence it will dry in from two to four hours.

The filler if allowed to cool will congeal and when in that condition, may be sliced into suitable sizes and dried and so long as it is kept in a dry state its quality will not be impaired.

To render the dry filler fit for use, it should be dissolved in warm water in the proportion of one pound of filler to one gallon of water.

In using the filler I may add that certain coloring matters may be added to it as the quality or nature of the work requires.

When the filler has been applied to wood and allowed to dry thereon the surface of said wood may then be sand-papered and varnished or painted in the usual way.

Having thus described my invention, what I claim as new, and desire to secure by Letters Patent, is—

A wood filler consisting of white glue, gum tragacanth, gum shellac, silicate of soda, corn starch and water, the same being combined in the proportions substantially as described.

JAMES J. ROBINSON.

Witnesses:
DUNCAN DOW,
WM. ROBINSON.